United States Patent [19]

Panaia et al.

[11] Patent Number: 4,493,488

[45] Date of Patent: Jan. 15, 1985

[54] PRESSURE CONTROL WHEEL CHAIR SEAT

[76] Inventors: David J. Panaia, 36 Hunt Seat Dr., Chicopee, Mass. 01020; Walter C. Lovell, 348 Mountain Rd., Wilbraham, Mass. 01095

[21] Appl. No.: 348,719

[22] Filed: Feb. 16, 1982

[51] Int. Cl.[3] .......... B62B 11/00

[52] U.S. Cl. .......... 280/42; 248/157; 248/340; 248/163.2; 280/289 WC; 280/650; 297/42; 297/DIG. 4

[58] Field of Search .......... 280/42, 650, 647, 289 WC; 297/42, 44, 180, 203, 218, 311, 314, 326, 327, 328, 337, 338, 345, 453, DIG. 4; 248/327, 163 A, 340, 157, 201, 222.1; 403/205, 206; 211/400

[56] References Cited

U.S. PATENT DOCUMENTS

| | | | |
|---|---|---|---|
| 833,068 | 10/1906 | Lloyd | 248/327 |
| 2,150,287 | 3/1939 | Minor | 5/464 |
| 2,402,085 | 6/1946 | Rideout | 297/DIG. 4 |
| 2,665,743 | 1/1954 | Cosper | 297/DIG. 4 |
| 2,672,920 | 3/1954 | Altgelt | 297/311 |
| 3,022,037 | 2/1962 | Stallard | 297/338 |
| 3,050,050 | 8/1962 | Kubicek | 280/42 |
| 3,758,398 | 12/1964 | Stryker | 297/337 |
| 3,833,256 | 9/1974 | Dehner | 297/44 |
| 4,305,557 | 12/1981 | Kowalski | 248/327 |
| 4,371,183 | 2/1983 | Dion | 280/42 |
| 4,391,009 | 7/1983 | Schild | 297/180 |

FOREIGN PATENT DOCUMENTS

| | | | |
|---|---|---|---|
| 958315 | 3/1950 | France | 414/400 |

*Primary Examiner*—Joseph F. Peters, Jr.
*Assistant Examiner*—Michael Mar
*Attorney, Agent, or Firm*—Charles R Fay

[57] ABSTRACT

A wheel chair seat comprised of a one piece rigid configuration that offers stable support allowing controlled height seating and having a special cushion comprised of varying density foam sections that assist the user therapeutically in preventing ulcerated areas on the buttocks. Apparatus is provided for pivoting the support with the cushion attached thereto as the wheel chair is folded.

9 Claims, 12 Drawing Figures

FIG. 1
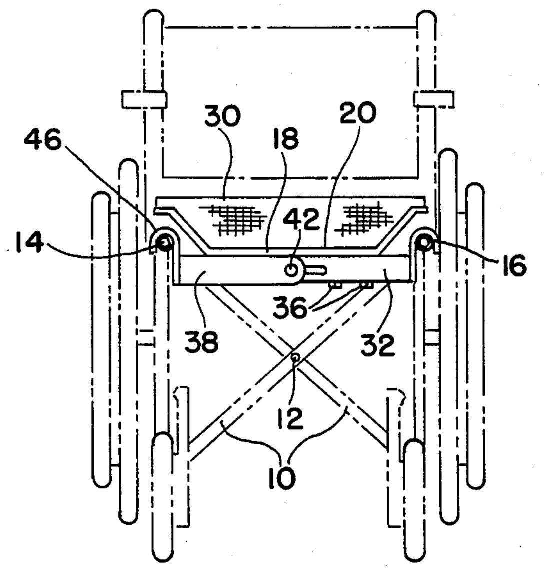
FIG. 2
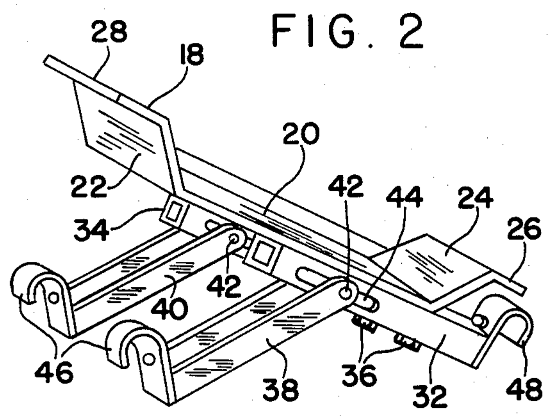
FIG. 3
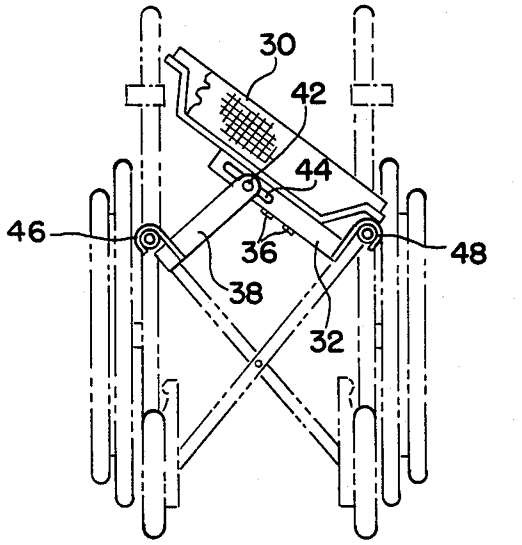
FIG. 4
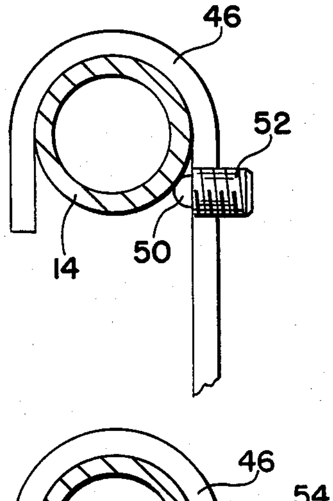
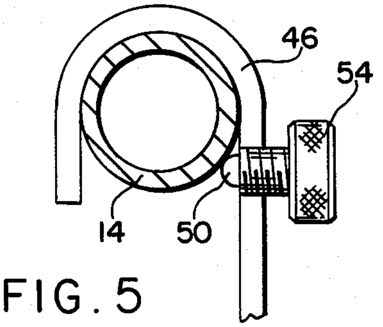
FIG. 5

PRESSURE CONTROL WHEEL CHAIR SEAT

BACKGROUND AND SUMMARY OF THE INVENTION

It is well known that persons confined to a wheel chair for lengths of time are susceptible to areas of ulcerations because of the restricted blood flow in specific areas. It is the object of the present invention to eliminate this ulcer problem by means of a simple rigid base seat support that is the receptacle for a special cushion that is custom formulated with various areas of density foams that re-distribute pressure in areas of the buttocks that normally cause restrictive blood flow, causing ulcerated conditions. A wheel chair patient can be tested and a pattern of high pressure areas can be printed as a pattern to formulate the cushion needed to custom protect a specific person.

The therapeutic wheel chair seat fits conveniently and can be mounted in most wheel chairs. It has a simple pivot arm construction that allows the wheel chair to be folded without interference, with the cushion in place.

The structure includes an adjustable screw knob for height adjustment for body stature to accommodate various size persons, and also has cushioning pads that additionally absorb shock from the wheel chair riding on rough surfaces.

BRIEF DESCRIPTION OF THE DRAWINGS

FIG. 1 is a view in front elevation illustrating the invention mounted in a wheel chair;

FIG. 2 is a perspective view illustrating the seat structure removed from the wheel chair;

FIG. 3 is a view similar to FIG. 2 illustrating the invention in a wheel chair partially folded;

FIG. 4 shows the pivot latch with spring plunger pin;

FIG. 5 shows the pivot latch with knob type screw;

PREFERRED EMBODIMENT OF THE INVENTION

Figure 6:
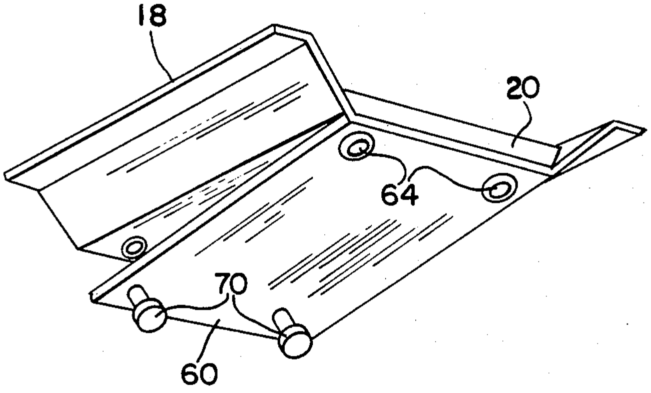
FIG. 6 is a perspective view of the seat support with lifting plate attached.

In FIGS. 1 and 2, a conventional wheel chair is shown in broken lines. Since this type of wheel chair is well known, it is believed that little further explanation with relation to this wheel chair is necessary, but it is of the type which has a scissors frame 10 with pivot 12 for folding the same from a useful condition to a condition wherein the wheels thereof approach each other as closely as possible. Also, it is provided with generally horizontal tubular frame members 14 and 16. The seat of the present invention is mounted on these tubular members.

The seat which is the principal subject matter of the present invention is generally indicated by the reference character 18 and it is provided with a generally flat seat support or bottom part 20 with inclined raised edges 22 and 24 having rims or the like 26, 28. This support is for the cushion 30 which will be described more particularly hereinafter but as shown in FIGS. 1 and 3 conforms to and nests into the frame or support member 20, 22, 24, etc.

Figure 11:
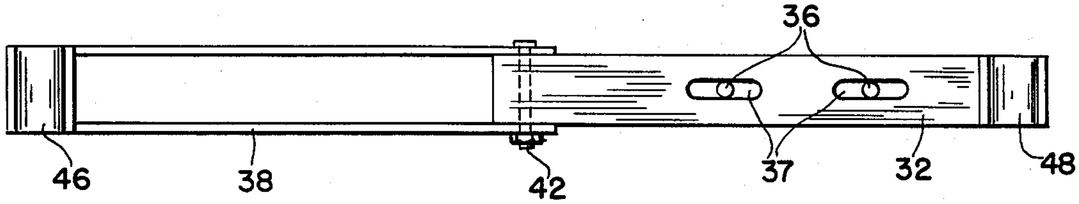

A pair of box-type structural members which are indicated at 32 and 34 (see FIG. 2) are bolted to the bottom of the member 20 by means of bolts such as shown at 36. These bolts 36 extend into the support 20 through elevated slots 37, FIG. 11, so that the members 32, 34 can be adjusted laterally relative to support 20, and seat cushion 30 for the accommodation thereof to different sizes of wheel chairs. Channel-shaped frame members 38, 40 are pivoted as at 42 (FIG. 2) in slots 44 in members 32 and 34 and complete the support for the seat inasmuch as frame members 32, 34 extend only part way across the bottom support 20. The reasons for the slots 44 is to maintain centralization of the support, for instance, parts 20, 22, 24 (see FIG. 3) when adjustment is made.

The frame member 32 and its cooperating member 38 pivoted thereto terminate in downwardly opening hooks 46, 48 that are received on the tubular members 14 and 16, this being illustrated with respect to tubular member 14 (FIGS. 4 and 5) and are locked in place by spring-pressed heads 50 of screws 52 which may be screwdriver operated or hand operated as at 54 in FIG. 5, to lock the parts together.

Now considering FIGS. 1, 2 and 3, it will be seen that when the wheel chair is folded from its fully operable position (FIG. 1) to the part-way folded representations in FIGS. 2 and 3, the pivot at 42 allows the frame 32, 38 to break, placing the seat 18 in a vertical or upright position between the wheels of the folded wheel chair so that the seat under consideration is easy to fold, etc.

Figure 7:
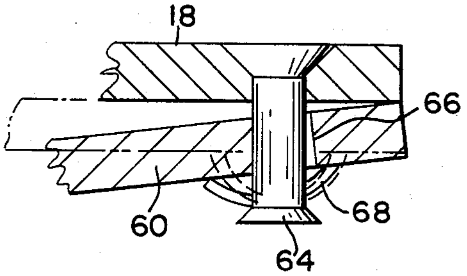
FIG. 7 is a sectional view illustrating the spring washer pivot for the lifting plate.

Referring now to FIGS. 6 and 7, there is a plate 60 which can be mounted in any way desired interposed between the support 20 and members 32, 34 to support the seat by a pivot arrangement including a headed pin indicated at 64 working in a tapered hole 66, but other kinds of pivots can also be used, the structure shown in FIG. 7 utilizing a domed apertured spring washer 68 holding the parts in a tension position. This construction utilizes screws or bolts 70 to work upon the rear end of support 20 as shown in FIG. 6 to elevate the same, or conversely to allow the same to drop, all looking toward the comfort of the user.

Figure 8:
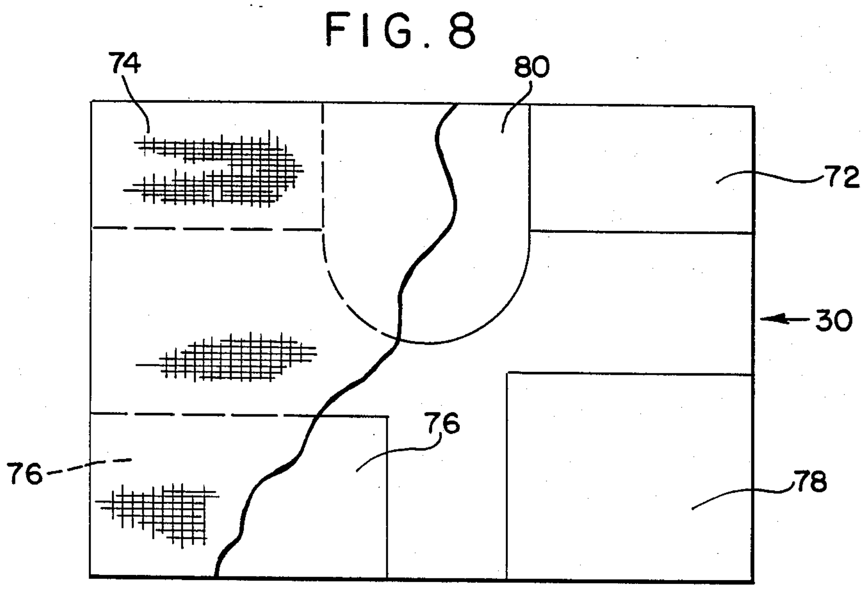
FIG. 8 is a plan view of the composite cushion.
Figure 9:
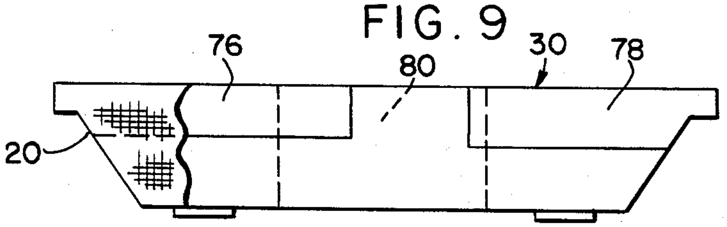
FIG. 9 is a front view of the composite cushion.
Figure 10:
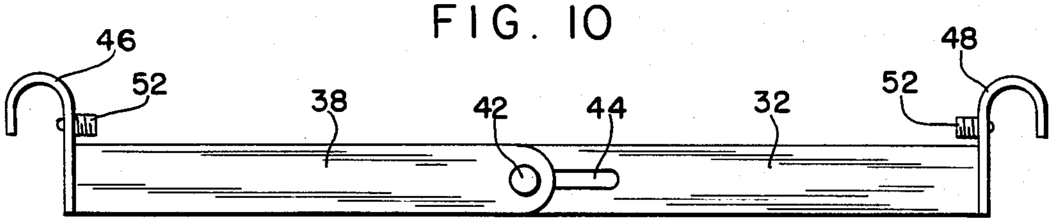
FIGS. 10 and 11 are views of the seat support folding frame members.

An example of the cushion is shown in FIGS. 8 and 9 and reference is made to areas such as at 62, 74, 76, 78, 80, etc., which may be made of different densities to suit the special needs of the buttocks of the particular person using the wheel chair. These areas may be of different shapes and sizes and depths. An assessment system has been developed to determine each user's particular needs. The measurements of the user's pressures which exist in these areas between the body and the seat are ascertained. Reaction to heat generation is determined and the material is then chosen which best meets the user's needs, with a view towards avoiding and using different compositions of materials in the makeup of the cushion part of the seat while maintaining normal seat height, eliminating the use of cushions which raise the seat height out of normal range, and which in turn result in the patient being improperly fitted in the chair. This concept aids in the prevention of decubitus ulcers which may occur in persons dependent on wheel chairs and the composition of the cushion materials is determined by scientifically evaluating the patient's sitting pressures in the areas of:

A. Ischial Tuberosity
B. Coccyx
C. Perineum
D. Trochanger and Thighs
E. Popliteal The cushions may be held against shifting by "Velcro".

Figure 12:
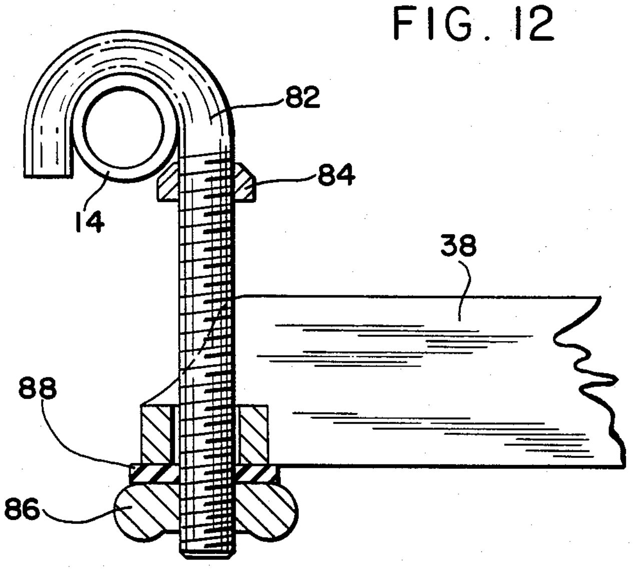
FIG. 12 is a view partly in section, showing a modified hook bolt.

FIG. 12 shows an alternate supporting device for the seat. A threaded hook bolt 82 is held in place over tubular member 14 with a threaded collar 84 which provides accommodation for different sizes of tubular members. A thumb nut 86 rests on frame member 38, for instance, and enables raising or lowering the seat without plate 60. By placing a resilient washer 88 between the nut 86 and member 38, for instance, riding shock is absorbed to some degree.

We claim:

1. A folding wheel chair including wheels, folding cross frames between the wheels of the chair, and tubular side frame members forming parts of the cross frames, a rigid wheel chair seat comprising a single rigid support having a flat bottom member and raised side edges, said cross frames being in a plane at right angles to the wheels, said flat bottom member having an underside, first structural members attached to the underside of said flat bottom member, said first structural members having end portions, second structural members having end portions, connection means for pivotally and slidably connecting said second frame members to said first frame members near the center of said support, said connection means including a pin in each of said second structural members for engaging a slot in each of said first structural members, and means located at the outer end portions of said first and second structural members for pivotably and releasably securing said structural members to said tubular side frame members, wherein said structural members pivot about said connection while said outer end portions remain secured to said tubular side frame members when said seat is pivoted from a horizontal seating position to a vertical folded position in which said seat is generally parallel with and between the wheels of the wheel chair.

2. In the wheel chair of claim 1, a cushion, said cushion having areas of different configurations and densities providing for maximum comfort and avoiding discomfort, the cushion being mounted on the seat and held in place by the raised side edges.

3. In the wheel chair of claim 2, the areas of different densities including coccyx, perineum, trochanter, and thighs.

4. The wheel chair of claim 2 including inclined edges on the support, the cushion having an edge configuration matching the support and means securing the cushion from sliding or shifting.

5. The wheel chair of claim 1 including means adjustably to raise and lower a portion of the support.

6. In the wheel chair of claim 1 including hooks on the outer ends of said first and second structural members, and means for locking the hooks to the tubular side frame members of the wheel chair.

7. The wheel chair of claim 6 wherein the hooks are adjustable to vary the seat height.

8. The wheel chair of claim 7 wherein said hooks are threaded and include a threaded collar to secure the bight of the hook to a respective tubular frame member.

9. The wheel chair of claim 8 including a resilient washer for each hook placed to absorb road shock.

* * * * *